United States Patent
Sedarat et al.

(10) Patent No.: US 9,893,756 B1
(45) Date of Patent: Feb. 13, 2018

(54) METHODS AND APPARATUS TO IMPROVE SNR FOR SIGNALING ACROSS MULTI-CHANNEL CABLES

(71) Applicant: Aquantia Corporation, San Jose, CA (US)

(72) Inventors: Hossein Sedarat, San Jose, CA (US); Ramin Farjad, Los Altos, CA (US)

(73) Assignee: Aquantia Corp., Milpitas, CA (US)

( * ) Notice: Subject to any disclaimer, the term of this patent is extended or adjusted under 35 U.S.C. 154(b) by 2 days.

(21) Appl. No.: 15/063,474

(22) Filed: Mar. 7, 2016

Related U.S. Application Data

(60) Provisional application No. 62/129,670, filed on Mar. 6, 2015.

(51) Int. Cl.
  *H04B 1/38* (2015.01)
  *H04W 4/00* (2009.01)
  *H04B 1/40* (2015.01)
  *H04B 17/336* (2015.01)
  *H04L 27/20* (2006.01)

(52) U.S. Cl.
  CPC ............. *H04B 1/40* (2013.01); *H04B 17/336* (2015.01); *H04L 27/20* (2013.01)

(58) Field of Classification Search
  CPC ..... H04L 1/0026; H04L 1/1812; H04L 5/006; H04L 1/0057; H04L 1/08; H04L 27/18; H04L 27/2627; H04L 1/0028; H04L 1/1867; H04L 1/20; H04L 27/20; H04L 5/0032; H04L 12/2878
  USPC .......................................... 375/219; 370/329
  See application file for complete search history.

(56) References Cited

U.S. PATENT DOCUMENTS

| | | | | |
|---|---|---|---|---|
| 6,137,829 A * | 10/2000 | Betts | ................. | H04L 25/03006 329/304 |
| 8,442,099 B1 * | 5/2013 | Sedarat | .................... | H04B 3/30 375/219 |
| 2002/0180547 A1 * | 12/2002 | Staszewski | ............. | G06F 1/025 332/109 |
| 2004/0246891 A1 * | 12/2004 | Kay | .................... | H04L 27/0008 370/215 |

(Continued)

*Primary Examiner* — Daniel Washburn
*Assistant Examiner* — Sarah Hassan
(74) *Attorney, Agent, or Firm* — Lance Kreisman; Peninsula Patent Group

(57) ABSTRACT

An Ethernet transceiver integrated circuit (IC) chip is disclosed. The IC chip includes multiple physical sub-channels, where each sub-channel transfers data symbols along a wired link. Each data symbol representing a group of multiple data bits. Logic determines a signal quality parameter value for each of the sub-channels. For each sub-channel, in a first mode where a given sub-channel exhibits a signaling quality above a first predetermined threshold, the logic assigns a modulation of a first type associated with a first constellation. In a second mode where a given sub-channel exhibits a signaling quality below the first predetermined threshold, the logic assigns a modulation of a second type associated with a second constellation that is sparser than the first constellation. Where a second sub-channel exhibits a signaling quality above a third predetermined threshold that is higher than the first threshold, the logic assigns a modulation of a third type associated with a third constellation that is denser than the first constellation.

16 Claims, 4 Drawing Sheets

(56) References Cited

U.S. PATENT DOCUMENTS

| | | | |
|---|---|---|---|
| 2007/0081475 A1* | 4/2007 | Telado | H04L 1/0003 370/255 |
| 2007/0192505 A1* | 8/2007 | Dalmia | H04L 5/1446 709/233 |
| 2009/0097442 A1* | 4/2009 | Diab | H04L 12/40136 370/329 |
| 2009/0150745 A1* | 6/2009 | Langner | H03M 13/11 714/752 |
| 2011/0249687 A1* | 10/2011 | Diab | H04L 1/0002 370/474 |
| 2013/0070823 A1* | 3/2013 | Malkin | H04L 25/03878 375/220 |

* cited by examiner

| Mode | TAB (bits) | TAD (bits) | TED (blocks) | AOB (bits) | ZSB (bits) | NDR (Gbps) |
|---|---|---|---|---|---|---|
| 4xPAM16 | 2048 | 1722 | 25 | 97 | 97 | 5.0 |
| 1xPAM8+3PAM16 | 1920 | 1594 | 24 | 34 | 162 | 4.8 |
| 2xPAM8+2PAM16 | 1792 | 1466 | 22 | 36 | 292 | 4.4 |
| 3xPAM8+1PAM16 | 1664 | 1338 | 20 | 38 | 422 | 4.0 |
| 4xPAM8 | 1536 | 1210 | 18 | 40 | 552 | 3.6 |

METHODS AND APPARATUS TO IMPROVE SNR FOR SIGNALING ACROSS MULTI-CHANNEL CABLES

RELATED APPLICATIONS

This Application claims the benefit of priority under 35 U.S.C. 119(e) to Provisional Application No. 62/129,670, filed Mar. 6, 2015, entitled METHODS AND APPARATUS TO IMPROVE SNR FOR SIGNALING ACROSS MULTI-CHANNEL CABLES, and is expressly incorporated by reference herein.

TECHNICAL FIELD

The disclosure herein relates to communications systems, and more specifically to high-speed Ethernet systems and methods.

BACKGROUND

Much of today's modern Ethernet infrastructure is based on twisted pair copper cables that meet certain specifications. One common "category" of Ethernet cable is identified as CAT5e, which is rated for data rates up to 1 Gbps. Recently, however, proposals have been made to use the existing Ethernet infrastructure in the enterprise environment for data rates above 1 Gbps and up to 5 Gbps and beyond. Using cabling such as CAT5e at higher rates poses challenges such as alien crosstalk.

The Ethernet network in an enterprise environment includes many point-to-point data links. A signal on one data link may cause alien crosstalk noise into another adjacent link. CAT5e cable is generally not standardized for alien crosstalk, and the operating behavior typically varies widely from cable to cable and setup to setup. A BASE-T Ethernet channel consists of 4 pairs (sub-channels) of twisted pair copper wire, with the data being modulated on each channel. For instance, in 10GBASE-T, the data is carried over a 2-D modulated signal, with each channel carrying 7 bits of data mapped to a point in a DSQ128 constellation. Other types of constellations include SQ256, which can carry 8 bits of information, and SQ64, which can carry 6 bits of information.

Generally, in order for a receiver to detect a transmitted constellation point correctly, the signal-to-noise power ratio (SNR) should be sufficiently high. For instance, in order to meet the target error rate of 10GBASE-T, the required SNR to decode data bits carried on a DSQ128 constellation is roughly 24 dB. A denser constellation like SQ256, which carries 8 bits per symbol, needs 3 dB more SNR (27 dB) to meet the same error rate. A sparser constellation like SQ64, which carries 6 bits per symbol, needs 3 dB less SNR (21 dB) to meet the same error rate.

Noise characteristics often depend on the type of cable as well as the bandwidth of the signal. Alien crosstalk can be a dominant source of noise when the bandwidth of the signal is large and the quality of the cable is poor. CAT6a cables, which are widely used in data centers for 10GBASE-T, are higher quality cables with better balance and farther spacing between copper pairs within and without the cable. CAT5e cables are lower quality cables but widely used in enterprise environment for up to 1G bit per second of data-rate. The noise characteristics in traditional Ethernet systems (10GBASE-T and 1000BASE-T) are fairly similar across all 4 lanes of the receiver.

There are new transceivers with higher throughput (5 and 2.5 Gbps) that are targeted for Cat5e cables in an enterprise environment. The bandwidth of these new transceivers is wider than the traditional 1000BASE-T systems, making them more susceptible to alien crosstalk. The alien far-end crosstalk (AFEXT) is the dominant type of alien crosstalk in these systems. The power of alien crosstalk in a 6-around-1 configuration may vary as much as 8 dB or more from one lane to another.

In a traditional approach to BASE-T systems, the SNR of the worst channel generally needs to be high enough for the constellation used in modulation. In this approach, the channels with higher SNR are not utilized efficiently.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Figure 1:
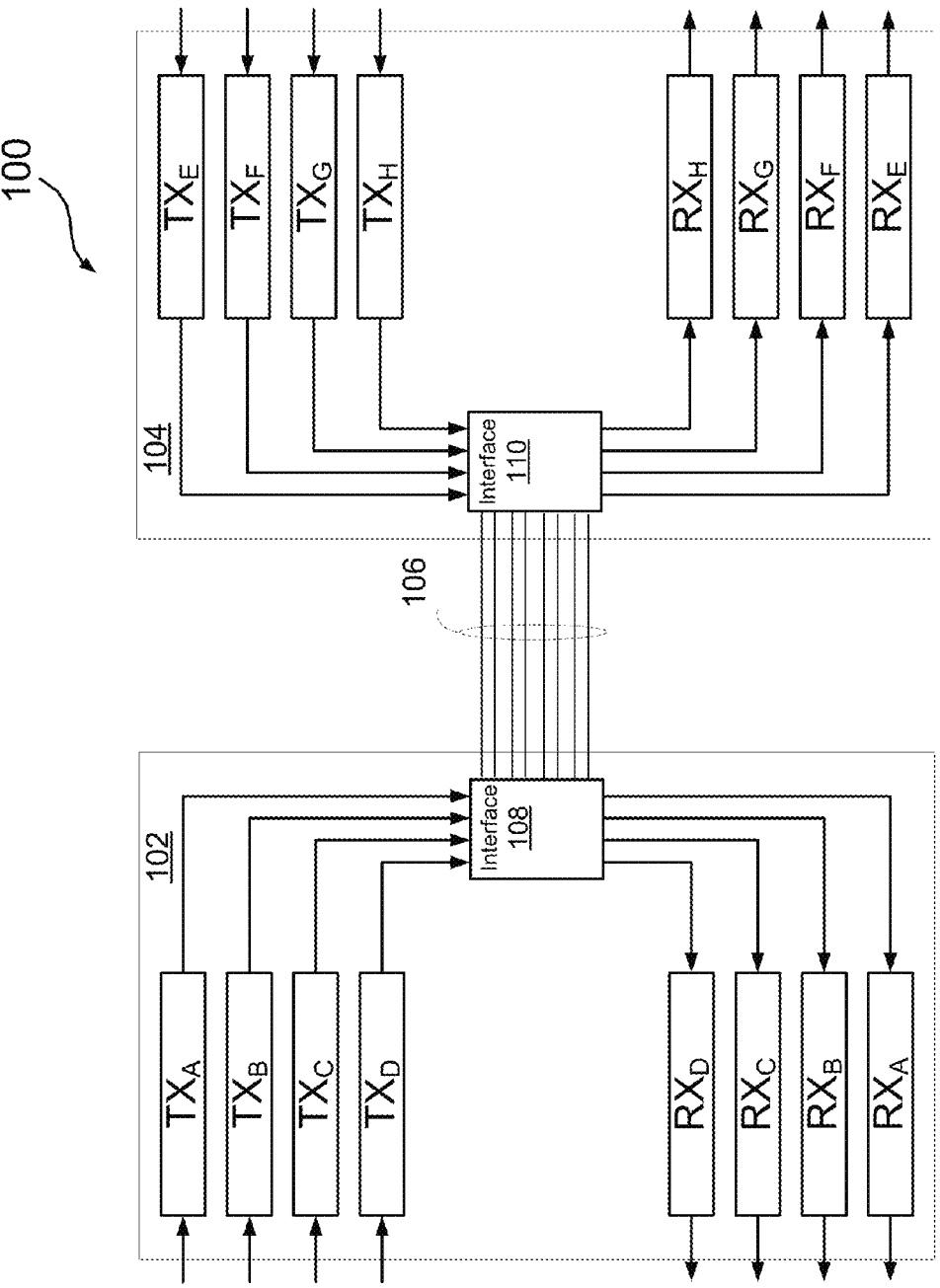
FIG. 1 illustrates a high-level transmitter/receiver (transceiver) channel architecture for an NBASE-T Ethernet transceiver.

FIG. 1 is a block diagram illustrating one embodiment of a communication system 100. The system includes a first transceiver integrated circuit (IC) or chip 102 and a second transceiver chip 104 that can communicate with each other. The first transceiver 102 includes "transceiver components" including one or more transmitters $TX_A$-$TX_D$ and one or more receivers $RX_A$-$RX_D$. Similarly, the second transceiver 104 includes various transceiver components including one or more transmitters $TX_E$-$TX_H$ and one or more receivers $RX_E$-$RX_H$. The transmitters $TX_A$-$TX_H$ shown in FIG. 1 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver which wants to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver chip 102 can communicate with the second transceiver chip 104 over one or more communication channels of a communication link 106. In one embodiment, such as one similar to the 10GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners."

An interface 108 can be provided in the first transceiver chip 102 and an interface 110 can be provided in the second transceiver chip 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

In one example, from the point of view of the first transceiver chip 102, data transmissions during a normal or regular operation mode from a local transmitter TX are provided to the interface 108, which outputs the data on a corresponding channel of the communication link 106. The data is received by the link partner, the second transceiver chip 104. The interface 110 of the transceiver 104 provides the received data to its receiver RX connected to that same channel. Furthermore, due to noise effects such as near-end crosstalk and echo, the data transmitted by the transmitters is also received by the near-end receivers in the same transceiver. Echo and crosstalk filters may be used to filter out this noise so that the receivers receive only data from other transceivers. In virtually all real scenarios, the data transmitted by a local transmitter has no dependence or relation with data being received by the corresponding local receiver.

In many instances, enterprise applications that employ the channel architecture of FIG. 1 utilize thousands of such deployments, resulting in complex crosstalk environments. The inventors have observed impairments that, during the characterization of Ethernet transceiver PHY's on actual CAT5e cable installations, limit the reach when operating at frequency ranges above 100 MHz—the frequency that CAT5e cables are designed for.

Proposed Ethernet transceiver physical layer devices (PHYs) enable 5 Gbps operation, where the Nyquist frequency is at 200 MHz, over a minimum length of CAT5e cable that reaches a minimum length of 100 meters, with no aggressors. For cables having a "6around1" configuration, the reach is often limited to around 50 to 60 meters. The 6around1 cabling has much less effect in a 2.5 Gbps mode, where the Nyquist frequency is limited to 100 MHz. Thus, the problem appears to be the level of alien crosstalk above 100 MHz in these cable configurations. However, an important observation of this 6around1 experiment is that not all four pairs of the cable suffer from severe alien crosstalk, and it is usually limited to one or two pairs in the CAT5e cable.

The observations above may be addressed in some embodiments by selectively improving the SNR in the pairs (sub-channels) suffering from higher alien crosstalk, and not all four pairs, and trading data rate for higher SNR only in those sub-channels. By doing so, an optimum data rate may be achieved. The tradeoff between data rate and SNR here is performed by reducing the number of bits per symbol, i.e. using PAM8 versus PAM16 in the target sub-channel, giving us 6 dB extra SNR.

Figure 2:
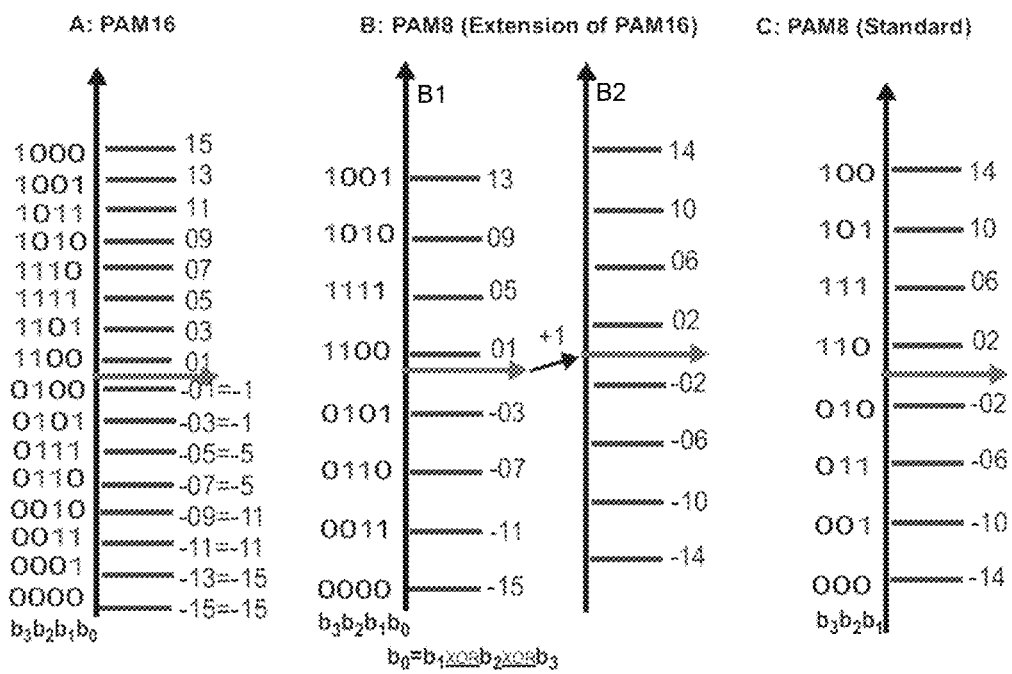
FIG. 2 illustrates multiple cases of coded symbols to signaling levels.

Referring now to FIG. 2, three separate graphs illustrating Grey-Coded PAM constellations and associated signal levels are shown. One embodiment, at "A", represents a PAM 16 constellation. Another embodiment is shown at "B", which represents a PAM 8 extension of PAM 16. A further embodiment, at "C", represents a standard PAM 8 format. The cases at "B' and "C" represent two methods of generating a PAM 8 symbol when any sub-channel is forced to drop the LSB bit due to low SNR on that sub-channel. The first method to generate the Gray-coded PAM8 from 3 bits is shows in case "B1", where the constellation is kept the same as PAM16 and the fourth bit (LSB) is generated by XORing the 3 bits. In this case, to properly map the 8 levels to the output to have a DC balanced signal, we need to shift the physical level of the physical transmit output by +1 level as shown in "B2." The other option is to assume we are dealing with a PAM8 symbol in this sub-channel using only 3 bits and map that to the 8 levels between −14 to +14 as shown in "C." The latter way of generating PAM8 should have easier implementation as it can simply use the PAM16 circuitry as long as logic generates the fourth bit as stated.

Figure 3:
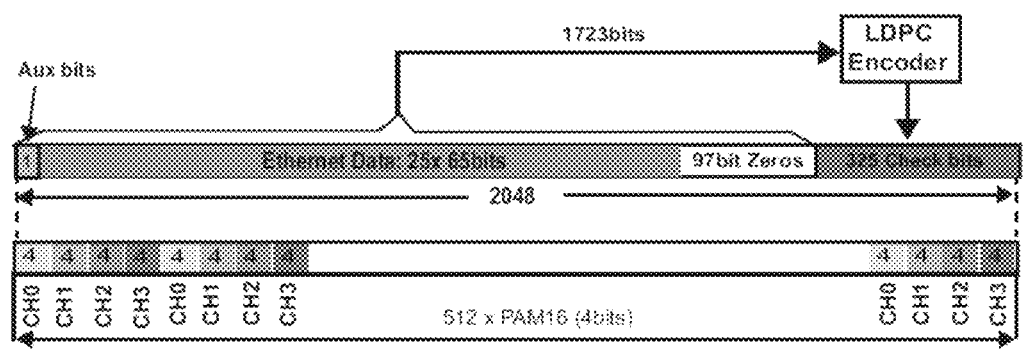
FIG. 3 illustrates one embodiment of a frame structure and associated bit mapping.

FIG. 3 illustrates one embodiment of a PAM 16 LDPC frame structure and mapping. The frame structure includes a grouping of 1625 data bits, which consist of 25×65-bit Ethernet blocks, and post 64/65 bit encoding of the original 1600 bits of raw data. The 1600 bits are combined with 325 parity check bits from an LDPC encoder, one auxiliary bit and 97 zero bits to complete a 2048-bit LDPC frame. The LDPC frame is sent over 512×PAM16 symbols, where each symbol consists of 4 bits, over four twisted pairs or sub-channels consecutively. The reason for the 97 bits stuffed in the LDPC frame instead of actual data is to set the data rate at exactly 5 Gbps or 2.5 Gbps when the symbol rate is 400 MSym/s or 200 MSym/s respectively. As shown, in one proposed grouping scheme, all four bits of the PAM16 symbols are coded within a single LDPC frame. A key advantage of the proposed constellation and framing, where all the bits in the 512 symbols carry the coded bits for a single LDPC frame, is the latency to buffer and form the 2048-bit LDPC frame reduces by almost 2× compared to the existing 10GBASE-T 128DSQ constellation.

In a scenario where one sub-channel suffers from low SNR, logic or software in the form of PHY firmware may detect the low SNR channel and change its modulation from PAM16 to PAM8 to increase the SNR in that channel by 6 dB. As a result, to keep the LDPC frame structure, encoding/decoding circuitry (H-Matrix) as well as the symbol rate, one embodiment uses the same 2048-bit LDPC frame with a 325-bit parity check, but stuffs the frame with extra zeros as one sub-channel now only carries 3 bits per symbol, effectively transmitting a total of 128 data bits less than an embodiment that transmits PAM16 on all four sub-channels. However, as opposed to the PAM 16 scheme, in this scenario we don't have to waste the 97 bits in the frame to arrive at a round effective data rate, and can use all the bits transmitted for data bits. Therefore, the LDPC frame structure and mapping on the transmit side for the case that only one channel is at PAM8 (3 bits) and the rest at PAM16 (4 bits) looks as shown in FIG. 4.

Figures 4, 5:
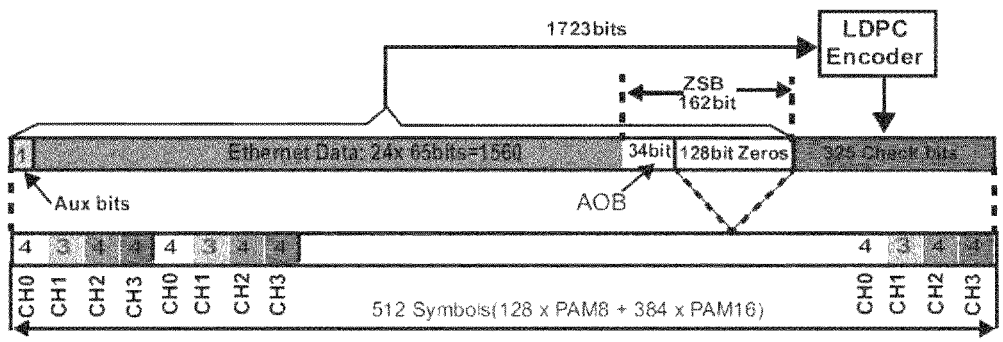
FIG. 4 illustrates an embodiment of a frame structure and associated bit mapping similar to FIG. 3.
FIG. 5 illustrates a table of flexible sub-channel data rates.

For the scheme of FIG. 4, the assumption is that the channel that is converted to PAM 8 is channel 1 (CH1). Each sub-channel transmits one quarter of the total symbols or 128 symbols. So as a result, we will have 128×PAM8 symbols from CH1 and (3×128) 384×PAM16 symbols from other three channels. This leads to a total available bits (TAB) over 512 symbol times of TAB=128×3bit+384×4bit=1920 bits We still have to allocate 325 bits to LDPC parity check bits and 1 auxiliary bit, leaving us with total available data (TAD) of:

TAD=1920$b$(TAB)−325$b$(Check)−1$b$(Aux)=1594 bits

The 1594 bits for TAD needs to carry integer numbers of 65-bit Ethernet blocks. Therefore we can transmit 1560 bits (24×65 bits) of Ethernet data within one LDPC frame in this mode, and the remaining transmitted 34 bits can be allocated for out of band (OOB) communication between PHYs, called here available OOB bits (AOB). Therefore, total Ethernet data (TED) and net data rate (NDR) before 64/65 Ethernet encoding in a LDPC frame will be:

TED=24 blocks×65bits=1560 bits

NDR=SymRate×[1560$b$×(64/65)]/[128sym]=12× SymRate

Thus total used bits (TUB) in the LDPC frame in this case is:

TUB=1$b$(Aux)+325$b$(Check)+1560$b$(TAD)=1886 bits leaving 162 bits (2048−1886) in the frame that needs to be stuffed with fixed values (e.g. zeros) for the purpose of LDPC encoding as shown in FIG. 3. So effectively in this case, we have 162 zero stuff bits (ZSB) in the LDPC frame that can sit between the Ethernet data bits and the check bits. A subtle observation here is that out of the 162 stuff bits in the LDPC frame, in fact AOB 34 bits are being transmitted over the line, while the remaining 128 bits are stuff bits, and are only for the purpose of completing the LDPC frame and do not exist in reality.

FIG. 5 shows the allocation of the bits within the LDPC frame for all scenarios where one or more (up to all four) sub-channels are converted to PAM8 modulation. Note the symbol rate for this table is assumed to be at 400 MS/s, which is the symbol rate of AQrate 5 Gbps. As stated earlier, in all above cases the LDPC frame size is still 2048 bits and we use the zero stuff bits (ZSB), which increases as we convert more sub-channels to PAM8, to complete the frame for encoding and decoding.

Figure 6:
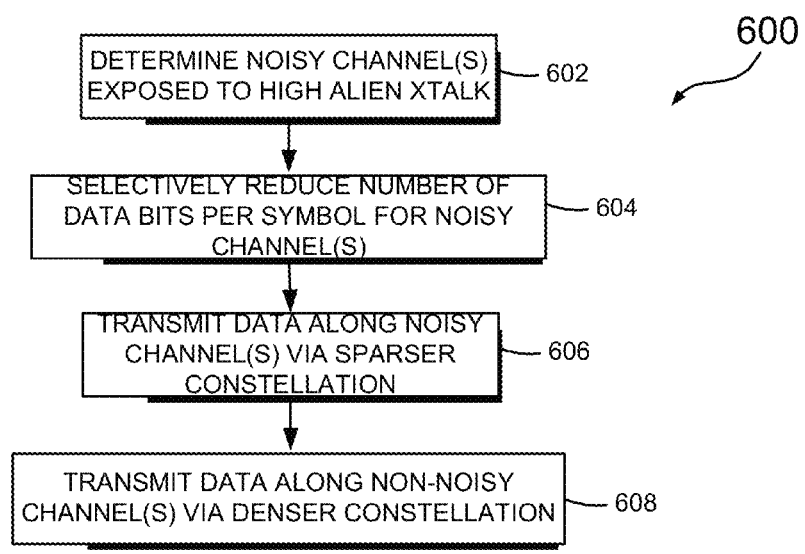
FIG. 6 illustrates one embodiment of a method of signaling across multiple physical sub-channels.

FIG. 6 illustrates one embodiment of a method, generally designated 600, for carrying out a selective sub-channel data rate selection due to noisy environments in an Ethernet network. The method begins by determining one or more noisy channels that may be exposed to high levels of alien crosstalk, at 602. This may be done, for example, by measuring the SNR or bit error rate of the channel. At 604, for each "noisy" sub-channel, a number of data bits per symbol may be selectively reduced. Data may then be transmitted, at 606, along the noisy sub-channel(s) via a sparser constellation. Data transmitted along non-noisy sub-channels may be transmitted at the default denser constellation, at 608.

While the embodiment described above provides for selective sub-channel data rates due to detected alien crosstalk, at a cost of reduced data rates, a further embodiment seeks to maintain a constant data rate when alien crosstalk affects one or more channels. In a new approach, each channel may have its own constellation best suited for its own SNR. To maintain the same data-rate, a bit is reassigned from one channel with low SNR to another with a higher SNR. In this way, the channel with low SNR will have a sparser constellation and the channel with a higher SNR will have a denser constellation. The target error rate is achieved with a lower SNR requirement.

As one specific example, consider a case where the baseline constellation is DSQ128. In each 2D symbol time, 28 bits from an LDPC encoder output is split into 4 sub-channels, each with 7 bits corresponding to a constellation point. In a traditional system, if the SNR of one channel falls below the target of 24 dB, the target error rate may not be achieved even if the other channels have healthy SNR margin. With this new method, if there is one channel that has more than 27 dB of SNR, then we can swap one bit out of the low SNR channel to the high SNR channel. The channel with low SNR will now have a SQ64 constellation (a sparser constellation than 128DSQ) and the channel with high SNR will be SQ256 (a denser constellation than 128DSQ). Both channels will have enough SNR to achieve the target error rate and since a bit is swapped from one channel to another, the overall data-rate remains the same. If two channels happen to have low SNR, one bit from each channel may be swapped to the other channels with higher SNR, again keeping the data rate the same while maintaining proper SNR for each constellation.

For one embodiment, selection logic, such as a multiplexer, may be employed between an LDPC encoder output and a THP input. The multiplexer redistributes the 28 bits (corresponding to the four 7-bit symbols being transmitted across the four links) to one of 19 possibilities: (1) each sub-channel has 7 bits (the traditional approach), (2) twelve cases where one channel carries 6 bits, and another one carries 8 bits, and the other two sub-channels each carry 7 bits, (3) six cases where two sub-channels carry six bits, and two sub-channels carry 8 bits. In the receiver, each channel will have its independent slicer with LLRs calculated based on the corresponding constellation for that channel. The decision to use the right bit assignment may be done during training or a fast-retrain process by a receiver and communicated to the far-end transmitter as part of Infofield exchange (e.g. during transition count-down) and synchronized at PCS-Test transition. Thus, the Infofield protocol may be utilized as the exchange and coordination protocol between link partners to choose and set the constellation density for each channel. In other words, the receiver decides the constellation density in each channel, and communicates that to the link partner.

Further, in addition to being used during training mode, the Infofield protocol may be used during data transmission mode in conjunction with a fast-retrain process to re-adjust the density of constellations per channel. This may be carried out in reaction to changes in the noise environment, such as when a new crosstalk channel is activated while the device is in data transmission mode. One embodiment of an Infofield protocol suitable for use in the embodiments herein is described in copending U.S. patent application Ser. No. 14/961,797, filed Dec. 7, 2015, titled "NBASE-T PHY-TO-PHY INFORMATION EXCHANGE METHOD AND APPARATUS", assigned to the assignee of the instant application and expressly incorporated herein by reference.

Figure 7:
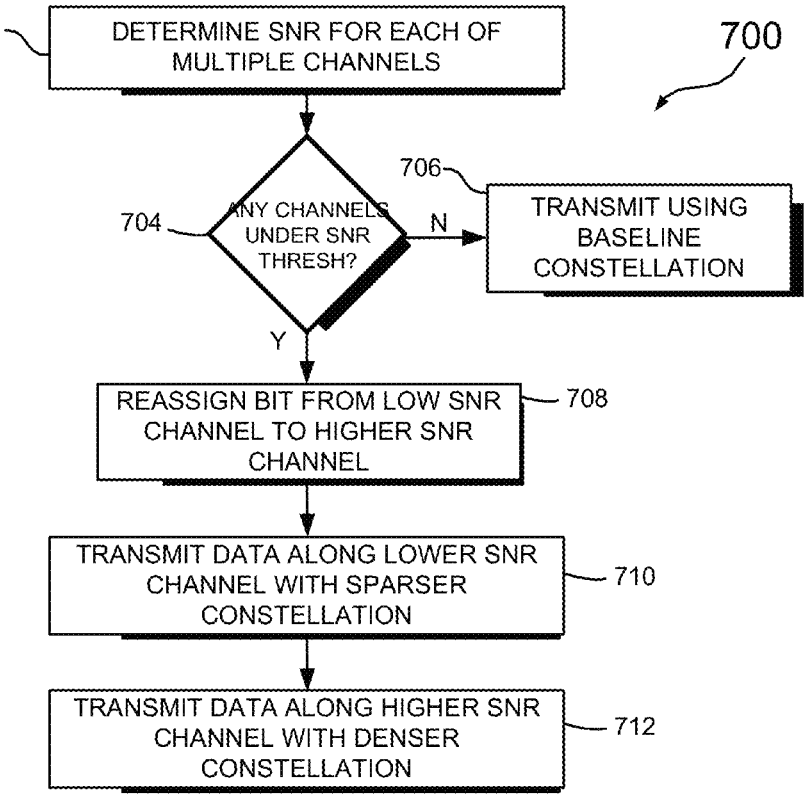
FIG. 7 illustrates a further embodiment of a method of signaling across multiple physical sub-channels.

FIG. 7 illustrates one embodiment of a method, generally designated 700, consistent with the above scheme to swap bits between sub-channels having higher and lower SNR characteristics. At 702, an SNR characteristic is determined for each of multiple physical sub-channels. A determination is then made, at 704, as to whether any of the sub-channels have an SNR below a baseline threshold, and those that have high SNR characteristics. If all of the sub-channels have baseline SNR values, then data is transmitted along the sub-channels using a baseline constellation, at 706. If any of the sub-channels has an SNR value below the baseline, then a bit from each symbol is reassigned from a low SNR sub-channel to a higher SNR sub-channel, at 708. Data is then transmitted along the lower SNR sub-channel with a sparser constellation, at 710. At 712, data is transmitted along a higher SNR sub-channel with a denser constellation. In this manner, a constant data rate may be maintained even under scenarios where a sub-channel experiences high levels of alien crosstalk.

Note that while the embodiments described herein consistently refer to SNR as a parameter indicative of a level of alien crosstalk affecting the sub-channels, other parameters may be measured in addition to or as an alternative to SNR, such as bit error rate (BER). Signal quality is generally determined by a receiver of the transmission signals, and can be represented not only as an SNR or BER, but also as "decision point signal to noise ratio" (DPSNR), "decision point mean square error" (DPMSE), "decision point peak error rate" (DPPER), frame error rate, and so forth.

In one embodiment, the PHY transmit power may be redistributed between channels similar to how bits are redistributed above. A channel that has higher SNR may give up some of its transmit power so that a lower SNR channel can transmit at a higher signal power. The total power of all channels may remain constant to meet emission limits. The redistribution of the transmit power may also be decided during training or fast-retrain and communicated from a receiver to a far-end transmitter through Infofield exchange.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. An Ethernet transceiver integrated circuit (IC) chip, comprising:
   multiple physical sub-channels, each sub-channel to transfer data symbols along a wired link, each data symbol representing a group of multiple data bits;
   PAM modulation circuitry to determine a signal quality parameter value for each of the sub-channels, and to assign modulations to the sub-channels;
   wherein, for each sub-channel,
   in a first mode where a given sub-channel exhibits a first signal quality parameter value above a first predetermined threshold, the PAM modulation circuitry assigns a modulation of a first type associated with a first constellation,
   in a second mode where a given sub-channel exhibits a second signal quality parameter value below the first predetermined threshold, the PAM modulation circuitry assigns a modulation of a second type associated with a second constellation that is sparser than the first constellation;

wherein a second sub-channel exhibits a third signal quality parameter value above a third predetermined threshold that is higher than the first threshold, and wherein the PAM modulation circuitry assigns a modulation of a third type associated with a third constellation that is denser than the first constellation; and wherein an aggregate data rate along the given sub-channel and the second sub-channel is constant whether operating in the first mode or the second mode.

2. The Ethernet transceiver IC chip of claim 1, further comprising distribution logic to distribute data among the multiple sub-channels based on detected quality parameters for each sub-channel.

3. The Ethernet transceiver IC chip of claim 1, wherein the first constellation comprises a DSQ128 constellation, the second constellation comprises an SQ64 constellation, and the third constellation comprises an SQ256 constellation.

4. The Ethernet transceiver IC chip of claim 2, wherein the distribution logic comprises a multiplexer disposed between a low-density parity-check (LDPC) encoder output and a Tomlinson-Harashima precoding (THP) precoder input.

5. The Ethernet transceiver IC chip of claim 2, wherein the distribution logic distributes the data based on bit assignments determined during a training mode of operation.

6. The Ethernet transceiver IC chip of claim 5, wherein the bit assignments are communicated to a second Ethernet transceiver IC chip during the training mode of operation via an Infofield exchange protocol.

7. The Ethernet transceiver IC chip of claim 1, wherein the PAM modulation circuitry assigns the modulations during a training mode of operation.

8. A method of operation in an Ethernet transceiver integrated circuit (IC) chip, the IC chip having multiple physical sub-channels, each sub-channel to transfer data symbols along a wired link, each data symbol representing a group of multiple data bits, the method comprising:

determining a signal quality parameter value for each of the sub-channels using PAM modulation circuitry;

assigning modulations to the sub-channels using the PAM modulation circuitry;

wherein, for each sub-channel, in a first mode where a given sub-channel exhibits a first signal quality parameter value above a first predetermined threshold, assigning a modulation of a first type associated with a first constellation, in a second mode where a given sub-channel exhibits a second signal quality parameter value below the first predetermined threshold, assigning a modulation of a second type associated with a second constellation that is sparser than the first constellation;

wherein a second sub-channel exhibits a third signal quality parameter value above a third predetermined threshold that is higher than the first threshold, and assigning a modulation of a third type associated with a third constellation that is denser than the first constellation; and wherein an aggregate data rate along the given sub-channel and the second sub-channel is constant whether operating in the first mode or the second mode.

9. The method of claim 8, further comprising distributing data among the multiple sub-channels based on detected quality parameters for each sub-channel.

10. The method of claim 9, wherein the distributing data is based on bit assignments determined during a training mode of operation.

11. The method of claim 10, wherein the bit assignments are communicated to a second Ethernet transceiver IC chip during the training mode of operation via an Infofield exchange protocol.

12. The method of claim 8, wherein the assigning modulations occurs during a training mode of operation.

13. A method of operation in an Ethernet transceiver integrated circuit (IC) chip, the IC chip having multiple physical sub-channels, each sub-channel to transfer data symbols along a wired link, each data symbol representing a group of multiple data bits, the method comprising:

during a training process having a predetermined number of steps, for each sub-channel, in a first mode where a given sub-channel exhibits a first signal quality parameter value above a first predetermined threshold, assigning a modulation of a first type associated with a first constellation, in a second mode where a given sub-channel exhibits a second signal quality parameter value below the first predetermined threshold, assigning a modulation of a second type associated with a second constellation that is sparser than the first constellation;

wherein a second sub-channel exhibits a third signal quality parameter value above a third predetermined threshold that is higher than the first threshold, and assigning a modulation of a third type associated with a third constellation that is denser than the first constellation; and wherein an aggregate data rate along the given sub-channel and the second sub-channel is constant whether operating in the first mode or the second mode.

14. The method of claim 13, wherein:

during a data transmission mode, detecting a change in a noise environment associated with each sub-channel; and readjusting the density of the constellation associated with each sub-channel.

15. The method of claim 14, further comprising:

communicating the readjustments to a link partner via an Infofield Exchange protocol.

16. The method of claim 15, further comprising:

performing a re-training process following the readjusting, the re-training process having fewer steps than the predetermined number of steps.

* * * * *